US012562160B2

(12) United States Patent
Shin

(10) Patent No.: US 12,562,160 B2
(45) Date of Patent: Feb. 24, 2026

(54) ARBITRATION BETWEEN AUTOMATED ASSISTANT DEVICES BASED ON INTERACTION CUES

(71) Applicant: GOOGLE LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 463 days.

(21) Appl. No.: 18/081,580

(22) Filed: Dec. 14, 2022

(65) Prior Publication Data

US 2024/0203411 A1     Jun. 20, 2024

(51) Int. Cl.
*G10L 15/22*     (2006.01)
*G10L 15/08*     (2006.01)

(52) U.S. Cl.
CPC ............. *G10L 15/22* (2013.01); *G10L 15/08* (2013.01); *G10L 2015/088* (2013.01); *G10L 2015/223* (2013.01); *G10L 2015/225* (2013.01)

(58) Field of Classification Search
CPC ..... G10L 15/22; G10L 15/08; G10L 15/1815; G10L 15/1822; G10L 15/26; G10L 15/28; G10L 15/30; G10L 2015/088; G10L 2015/223; G10L 2015/225; G06F 3/167; G06F 40/35
See application file for complete search history.

(56) References Cited

U.S. PATENT DOCUMENTS

2016/0155443 A1     6/2016   Khan et al.
2017/0076720 A1     3/2017   Gopalan et al.

2017/0083285 A1     3/2017   Meyers et al.
2019/0066670 A1*    2/2019   White ..................... G10L 15/22
2019/0244618 A1*    8/2019   Newendorp ............ G10L 15/32
2019/0341049 A1*   11/2019   Cheng ................... G06F 1/3206
2023/0343329 A1*   10/2023   Figov ..................... G10L 15/04

FOREIGN PATENT DOCUMENTS

EP             3944231 A1 *   1/2022   ............. G10L 15/26

OTHER PUBLICATIONS

European Patent Office; International Search Report and Written Opinion issued in Application No. PCT/US2022/053171; 12 pages; Jul. 25, 2023.

* cited by examiner

*Primary Examiner* — Andrew C Flanders
(74) *Attorney, Agent, or Firm* — Gray Ice Higdon

(57) ABSTRACT

Techniques are described herein for arbitration between automated assistant devices based on interaction cues. A method includes: receiving, via one or more microphones of a first computing device, first audio data that captures a spoken utterance of a user; determining that each of one or more additional computing devices has detected the spoken utterance of the user; determining that hotword arbitration is to be initiated between the first computing device and the one or more additional computing devices; for each of the first computing device and the one or more additional computing devices, identifying a similarity score for the computing device; selecting a target computing device, from the first computing device and the one or more additional computing devices, based on the similarity scores; and causing the target computing device to respond to a query that is included in the spoken utterance of the user.

16 Claims, 5 Drawing Sheets

100

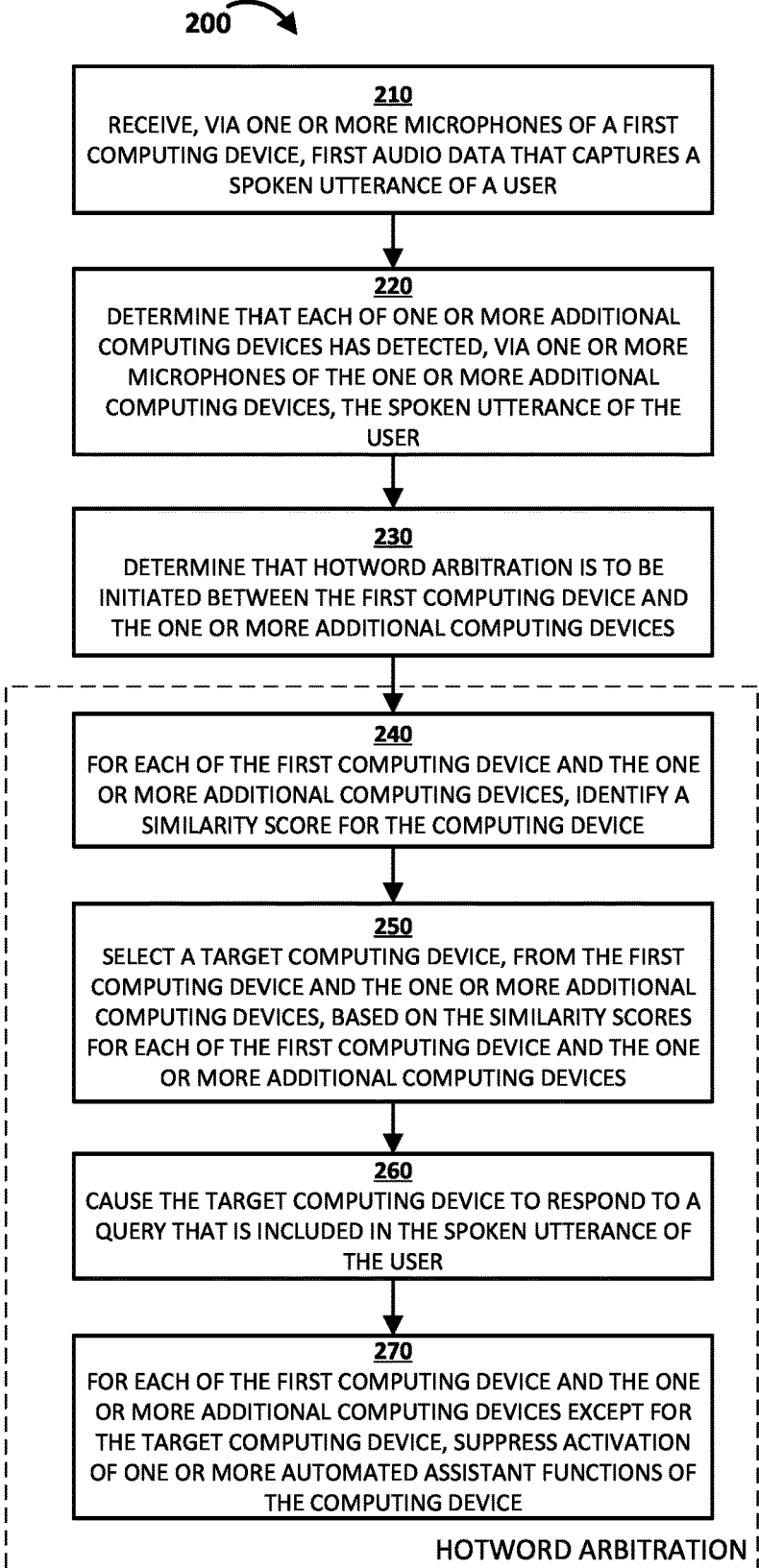

200

210
RECEIVE, VIA ONE OR MORE MICROPHONES OF A FIRST COMPUTING DEVICE, FIRST AUDIO DATA THAT CAPTURES A SPOKEN UTTERANCE OF A USER

220
DETERMINE THAT EACH OF ONE OR MORE ADDITIONAL COMPUTING DEVICES HAS DETECTED, VIA ONE OR MORE MICROPHONES OF THE ONE OR MORE ADDITIONAL COMPUTING DEVICES, THE SPOKEN UTTERANCE OF THE USER

230
DETERMINE THAT HOTWORD ARBITRATION IS TO BE INITIATED BETWEEN THE FIRST COMPUTING DEVICE AND THE ONE OR MORE ADDITIONAL COMPUTING DEVICES

240
FOR EACH OF THE FIRST COMPUTING DEVICE AND THE ONE OR MORE ADDITIONAL COMPUTING DEVICES, IDENTIFY A SIMILARITY SCORE FOR THE COMPUTING DEVICE

250
SELECT A TARGET COMPUTING DEVICE, FROM THE FIRST COMPUTING DEVICE AND THE ONE OR MORE ADDITIONAL COMPUTING DEVICES, BASED ON THE SIMILARITY SCORES FOR EACH OF THE FIRST COMPUTING DEVICE AND THE ONE OR MORE ADDITIONAL COMPUTING DEVICES

260
CAUSE THE TARGET COMPUTING DEVICE TO RESPOND TO A QUERY THAT IS INCLUDED IN THE SPOKEN UTTERANCE OF THE USER

270
FOR EACH OF THE FIRST COMPUTING DEVICE AND THE ONE OR MORE ADDITIONAL COMPUTING DEVICES EXCEPT FOR THE TARGET COMPUTING DEVICE, SUPPRESS ACTIVATION OF ONE OR MORE AUTOMATED ASSISTANT FUNCTIONS OF THE COMPUTING DEVICE

HOTWORD ARBITRATION

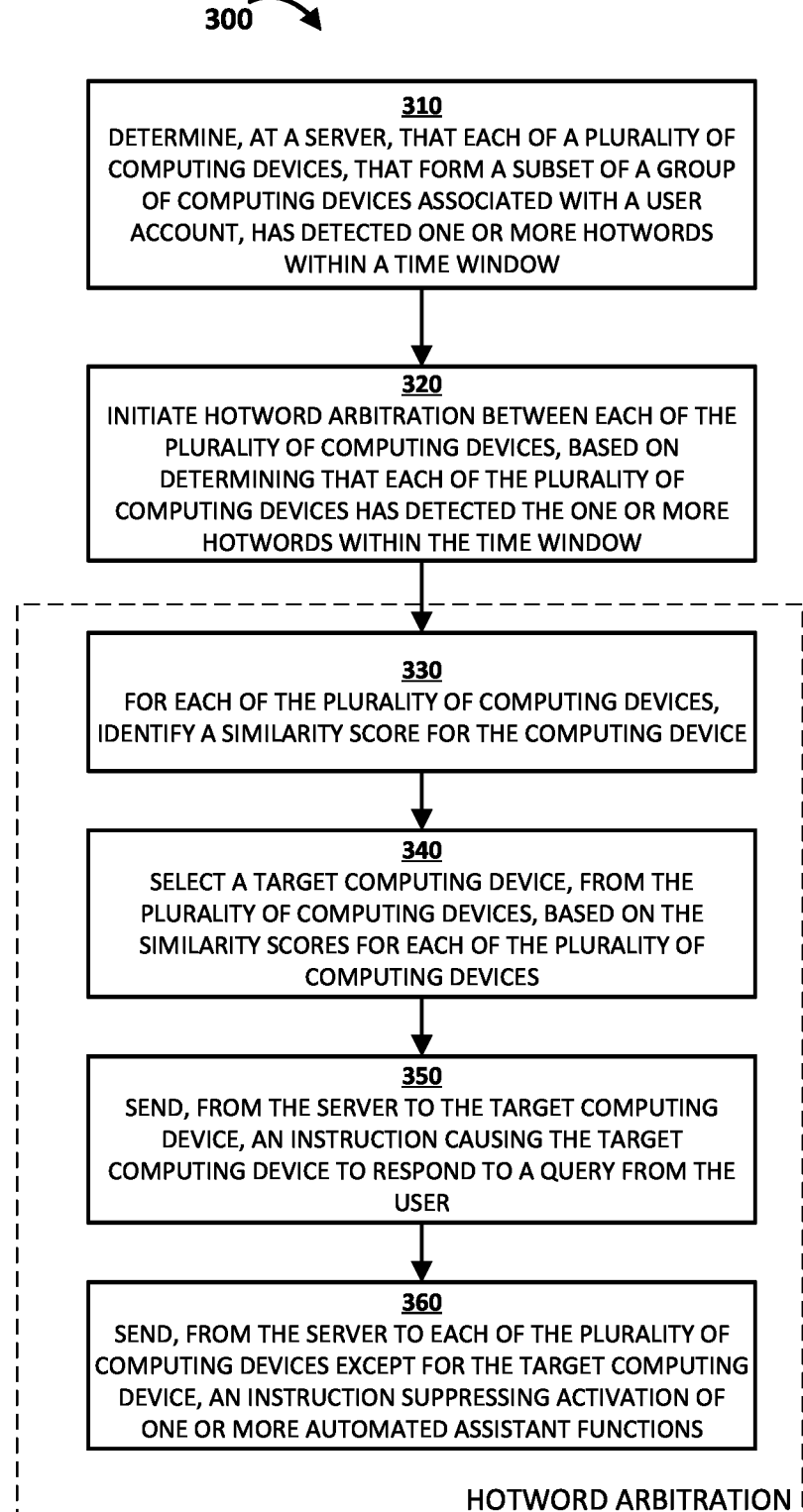

310
DETERMINE, AT A SERVER, THAT EACH OF A PLURALITY OF COMPUTING DEVICES, THAT FORM A SUBSET OF A GROUP OF COMPUTING DEVICES ASSOCIATED WITH A USER ACCOUNT, HAS DETECTED ONE OR MORE HOTWORDS WITHIN A TIME WINDOW

320
INITIATE HOTWORD ARBITRATION BETWEEN EACH OF THE PLURALITY OF COMPUTING DEVICES, BASED ON DETERMINING THAT EACH OF THE PLURALITY OF COMPUTING DEVICES HAS DETECTED THE ONE OR MORE HOTWORDS WITHIN THE TIME WINDOW

330
FOR EACH OF THE PLURALITY OF COMPUTING DEVICES, IDENTIFY A SIMILARITY SCORE FOR THE COMPUTING DEVICE

340
SELECT A TARGET COMPUTING DEVICE, FROM THE PLURALITY OF COMPUTING DEVICES, BASED ON THE SIMILARITY SCORES FOR EACH OF THE PLURALITY OF COMPUTING DEVICES

350
SEND, FROM THE SERVER TO THE TARGET COMPUTING DEVICE, AN INSTRUCTION CAUSING THE TARGET COMPUTING DEVICE TO RESPOND TO A QUERY FROM THE USER

360
SEND, FROM THE SERVER TO EACH OF THE PLURALITY OF COMPUTING DEVICES EXCEPT FOR THE TARGET COMPUTING DEVICE, AN INSTRUCTION SUPPRESSING ACTIVATION OF ONE OR MORE AUTOMATED ASSISTANT FUNCTIONS

HOTWORD ARBITRATION

Fig. 3

ARBITRATION BETWEEN AUTOMATED ASSISTANT DEVICES BASED ON INTERACTION CUES

BACKGROUND

Humans can engage in human-to-computer dialogs with interactive software applications referred to herein as "automated assistants" (also referred to as "digital assistants", "digital agents", "interactive personal assistants", "intelligent personal assistants", "assistant applications", "conversational agents", etc.). For example, humans (who, when they interact with automated assistants, may be referred to as "users") may provide commands and/or requests to an automated assistant using spoken natural language input (i.e., spoken utterances), which may in some cases be converted into text and then processed, by providing textual (e.g., typed) natural language input, and/or through touch and/or utterance free physical movement(s) (e.g., hand gesture(s), eye gaze, facial movement, etc.). An automated assistant generally responds to a request by providing responsive user interface output (e.g., audible and/or visual user interface output), controlling one or more smart devices, and/or controlling one or more function(s) of a device implementing the automated assistant (e.g., controlling other application(s) of the device).

An automated assistant may be a software application that executes on a client device. The client device may be a standalone interactive speaker, a standalone interactive display device (which may also include a speaker and/or camera), a smart appliance such as a smart television (or a standard television equipped with a networked dongle with automated assistant capabilities), a desktop computing device, a laptop computing device, a tablet computing device, a mobile phone computing device, a computing device of a vehicle of the user (e.g., an in-vehicle communications system, an in-vehicle entertainment system, an in-vehicle navigation system), and/or a wearable apparatus of the user that includes a computing device (e.g., a watch of the user having a computing device, glasses of the user having a computing device, a virtual or augmented reality computing device).

Automated assistants typically rely upon a pipeline of components in processing user requests. For example, a hotword detecting engine can be used to process audio data by monitoring for occurrence of a spoken hotword (wake word) (e.g., "OK Assistant") and, in response to detecting the occurrence, cause processing by other component(s) to take place. As another example, an automatic speech recognition (ASR) engine can be used to process audio data that includes a spoken utterance, to generate a transcription (i.e., sequence of term(s) and/or other token(s)) of the user's utterance. The ASR engine can process audio data based on its following occurrence of a spoken hotword, as detected by the hotword detection engine, and/or in response to other invocation(s) of the automated assistant. As another example, a natural language understanding (NLU) engine can be used to process text of a request (e.g., text converted from a spoken utterance using ASR) to generate a symbolic representation, or belief state, that is a semantic representation of the text. For instance, the belief state could include intent(s) that correspond to the text and optionally parameter(s) (e.g., slot values) for the intent(s). The belief state, once fully formed (e.g., all mandatory parameters resolved) through one or more dialog turns, represents action(s) to be performed responsive to the spoken utterance. A separate fulfillment component can then utilize the fully formed belief state to perform the action(s) that corresponds to the belief state.

An environment may include multiple automated assistants. For example, an environment may include a mobile phone computing device that is carried by a user, a standalone interactive speaker, a standalone interactive display device (which may also include a speaker and/or camera), a smart appliance such as a smart television (or a standard television equipped with a networked dongle with automated assistant capabilities), and a wearable apparatus of the user that includes a computing device (e.g., a watch of the user having a computing device, glasses of the user having a computing device, a virtual or augmented reality computing device), each executing an automated assistant. In the environment, two or more of the multiple automated assistants may detect (e.g., via microphone(s)) the same spoken utterance from a user, as a result of being proximately located. Based on two or more of the multiple automated assistants detecting the occurrence of a hotword in the same spoken utterance from the user, each of the two or more automated assistants may respond to a query of the user.

Computing resources may be wasted in cases where each of two or more automated assistant devices detects the same spoken utterance, each detects a particular hotword in that spoken utterance, and each responds to a query of the user based on detecting the particular hotword. This can be especially problematic for older and/or lower resource assistant devices, which can be limited in terms of processing power and/or memory capacity. Additionally, the user experience may be suboptimal in cases where each of two or more automated assistant devices responds to the same query of the user.

SUMMARY

Some implementations disclosed herein are directed to arbitration between automated assistant devices based on interaction cues. As described in more detail herein, two or more automated assistant devices that are proximately located within an environment may perform arbitration to determine a target automated assistant device to respond to a query that is included in a spoken utterance of a user. Implementations may reduce overall processing costs by reducing or avoiding the occurrence of two or more automated assistant devices responding to the same query.

In some implementations, the target automated assistant device may be identified based on interaction cues that may serve as a proxy indicating user intent. User touch, tap, and/or other gestural signals may be utilized to determine to which automated assistant device a user intended a query to be directed. In an example, a user may utter, "OK Assistant", followed by a query. While making this utterance, the user may interact with a smartphone by touching its display screen. Even though the user's utterance may be detected by microphones of three separate automated assistant devices (e.g., a smartphone, a smartwatch, and a smart speaker), based on a measure that correlates local touch events with the "OK Assistant" query event, the system may determine that the smartphone is the target automated assistant device (i.e., the device to which the user is presumed to have intended to direct the query). Based on this determination, the system may cause the smartphone, as the target automated assistant device, to respond to the query, and/or may suppress action of one or more automated assistant functions of the smartwatch and the smart speaker.

In various implementations, a method implemented by one or more processors may include: receiving, via one or more microphones of a first computing device, first audio data that captures a spoken utterance of a user; determining that each of one or more additional computing devices has detected, via one or more microphones of the one or more additional computing devices, the spoken utterance of the user, wherein the first computing device and the one or more additional computing devices are included in a group of computing devices; determining that hotword arbitration is to be initiated between the first computing device and the one or more additional computing devices, wherein determining that hotword arbitration is to be initiated is based on the first computing device receiving the first audio data that captures the spoken utterance of the user and based on determining that each of the one or more additional computing devices has detected the spoken utterance of the user; and responsive to determining that hotword arbitration is to be initiated: for each of the first computing device and the one or more additional computing devices, identifying a similarity score for the computing device, the similarity score being based on (i) a query signal for the computing device and (ii) an interaction signal for the computing device; selecting a target computing device, from the first computing device and the one or more additional computing devices, based on the similarity scores for each of the first computing device and the one or more additional computing devices; and causing the target computing device to respond to a query that is included in the spoken utterance of the user or to respond to a query that is included in a subsequent spoken utterance, of the user, that follows the spoken utterance of the user.

In some implementations, determining that each of the one or more additional computing devices has detected the spoken utterance of the user includes determining that each of the first computing device and the one or more additional computing devices has detected, within a time window, one or more hotwords being present in the spoken utterance of the user.

In some implementations, the method may further include processing the first audio data using a machine learning model to generate a predicted output that indicates a probability of the one or more hotwords being present in the spoken utterance of the user, that is captured in the first audio data, wherein determining that the first computing device has detected the one or more hotwords is based on the probability of the one or more hotwords being present in the spoken utterance of the user satisfying a threshold that is indicative of the one or more hotwords being present in the spoken utterance of the user. In some implementations, determining that each of the one or more additional computing devices has detected the one or more hotwords is based on each of the one of the one or more additional computing devices determining that the probability of one or more hotwords being present in the spoken utterance of the user satisfies the threshold that is indicative of the one or more hotwords being present in the spoken utterance of the user.

In some implementations, the query signal for the computing device is a time series, each data point in the time series indicating a probability of one or more hotwords being present at a particular time. In some implementations, the interaction signal for the computing device is a time series, each data point in the time series indicating a level of user interaction with the computing device at a particular time.

In some implementations, identifying the similarity score for the computing device includes determining a measure based on comparing the query signal for the computing device and the interaction signal for the computing device. In some implementations, determining the measure based on comparing the query signal for the computing device and the interaction signal for the computing device includes determining a dot product of the query signal for the computing device and the interaction signal for the computing device. In some implementations, determining the measure based on comparing the query signal for the computing device and the interaction signal for the computing device includes determining a cosine similarity of the query signal for the computing device and the interaction signal for the computing device.

In some implementations, the method may further include, in response to selecting the target computing device, for each of the first computing device and the one or more additional computing devices except for the target computing device, suppressing activation of one or more automated assistant functions of the computing device.

In some implementations, each computing device in the group of computing devices is associated with a same user account. In some implementations, the group of computing devices further includes a second computing device that is different from the first computing device and the one or more additional computing devices, and the second computing device is excluded from hotword arbitration based on determining that the second computing device has not detected the spoken utterance of the user. In some implementations, the group of computing devices includes a smartphone, a smartwatch, and a smart speaker.

In some additional or alternative implementations, a computer program product may include one or more computer-readable storage media having program instructions collectively stored on the one or more computer-readable storage media. The program instructions may be executable to: determine, at a server, that each of a plurality of computing devices, that form a subset of a group of computing devices associated with a user account, has detected one or more hotwords within a time window; and initiate hotword arbitration between each of the plurality of computing devices, based on determining that each of the plurality of computing devices has detected the one or more hotwords within the time window, including: for each of the plurality of computing devices, identifying a similarity score for the computing device, the similarity score being based on (i) a query signal for the computing device and (ii) an interaction signal for the computing device; selecting a target computing device, from the plurality of computing devices, based on the similarity scores for each of the plurality of computing devices; and sending, from the server to the target computing device, an instruction causing the target computing device to respond to a query from the user.

In some implementations, identifying the similarity score for the computing device includes determining a dot product of the query signal for the computing device and the interaction signal for the computing device. In some implementations, identifying the similarity score for the computing device includes determining a cosine similarity of the query signal for the computing device and the interaction signal for the computing device.

In some implementations, the program instructions may be further executable to send, from the server to each of the plurality of computing devices except for the target computing device, an instruction suppressing activation of one or more automated assistant functions.

In some additional or alternative implementations, a system may include a processor, a computer-readable memory, one or more computer-readable storage media, and program instructions collectively stored on the one or more computer-readable storage media. The program instructions may be executable to: receive, via one or more microphones of a first computing device, first audio data that captures a spoken utterance of a user; determine that each of one or more additional computing devices has detected, via one or more microphones of the one or more additional computing devices, the spoken utterance of the user, wherein the first computing device and the one or more additional computing devices are included in a group of computing devices; determine that hotword arbitration is to be initiated between the first computing device and the one or more additional computing devices, wherein determining that hotword arbitration is to be initiated is based on the first computing device receiving the first audio data that captures the spoken utterance of the user and based on determining that each of the one or more additional computing devices has detected the spoken utterance of the user; and responsive to determining that hotword arbitration is to be initiated: for each of the first computing device and the one or more additional computing devices, identify a similarity score for the computing device, the similarity score being based on (i) a query signal for the computing device and (ii) an interaction signal for the computing device; select a target computing device, from the first computing device and the one or more additional computing devices, based on the similarity scores for each of the first computing device and the one or more additional computing devices; and cause the target computing device to respond to a query that is included in the spoken utterance of the user or to respond to a query that is included in a subsequent spoken utterance, of the user, that follows the spoken utterance of the user.

Through utilization of one or more techniques described herein, overall processing costs across multiple automated assistant devices in an environment may be reduced, and overall memory and processing resources across the multiple automated assistant devices may be more efficiently utilized. This may result in improved performance and an improved user experience across the multiple automated assistant devices.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

BRIEF DESCRIPTION OF THE DRAWINGS

FIG. 2 depicts a flowchart illustrating an example method for practicing selected aspects of the present disclosure.

FIG. 3 depicts another flowchart illustrating an example method for practicing selected aspects of the present disclosure.

DETAILED DESCRIPTION

Users may engage an automated assistant using any one of multiple automated assistant devices. For example, some users may possess a coordinated "ecosystem" of automated assistant devices that can receive user input directed to the automated assistant and/or can be controlled by the automated assistant, such as one or more smartphones, one or more tablet computers, one or more vehicle computing systems, one or more wearable computing devices, one or more smart televisions, one or more interactive standalone speakers, one or more interactive standalone speakers with a display, one or more IoT devices (e.g., smart thermostats), among other assistant devices.

A user can engage in human-to-computer dialog with an automated assistant using any of these assistant devices (assuming an automated assistant client is installed and the assistant device is capable of receiving input). In some cases, these automated assistant devices may be scattered around the user's primary residence, secondary residence, workplace, and/or other structure. For example, mobile assistant devices such as smartphones, tablets, smartwatches, etc., may be on the user's person and/or wherever the user last placed them. Other automated assistant devices, such as traditional desktop computers, smart televisions, interactive standalone speakers, and IoT devices may be more stationary but nonetheless may be located at various places (e.g., rooms) within the user's home or workplace.

Figure 1:
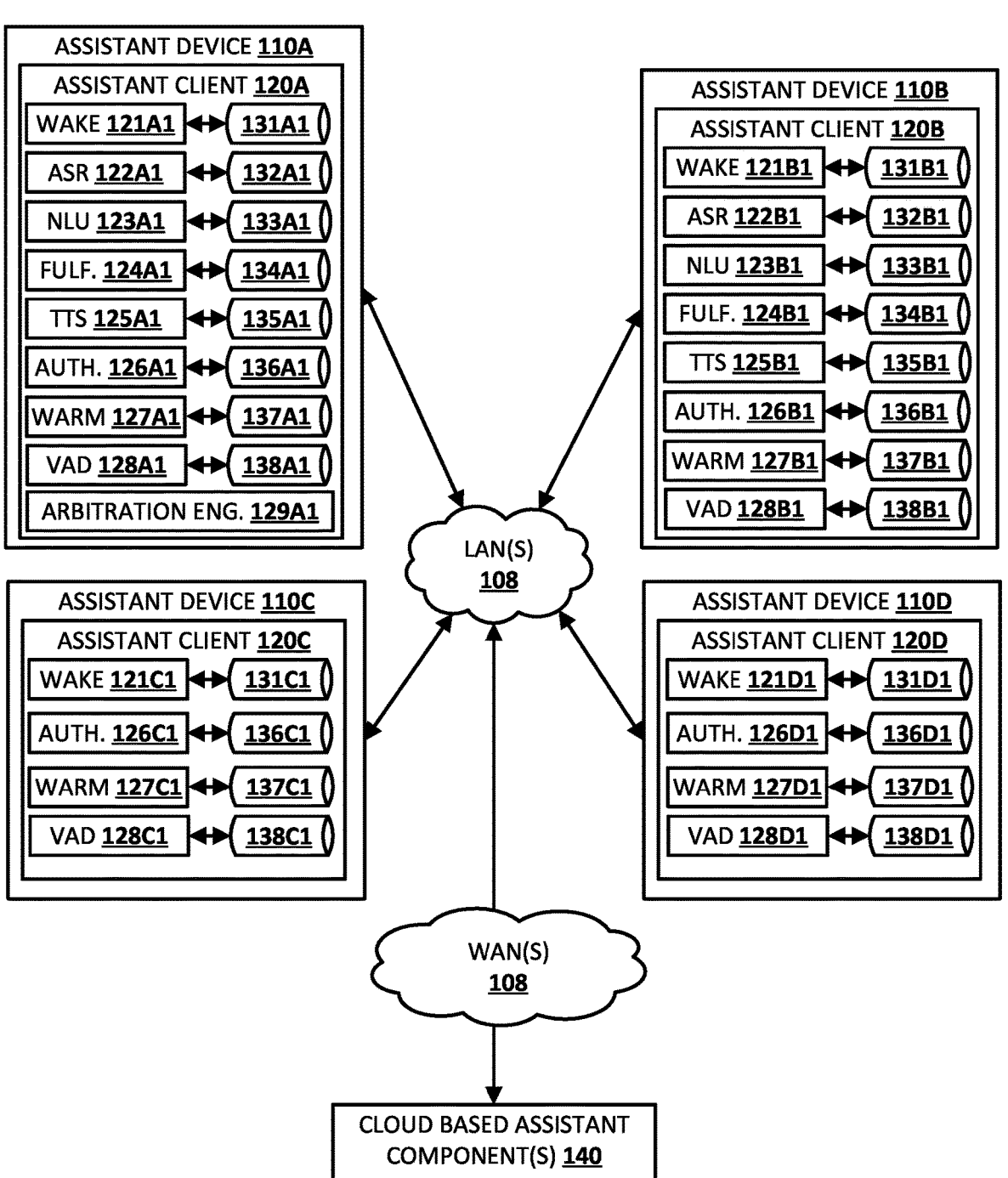
FIG. 1 schematically depicts an example environment in which selected aspects of the present disclosure may be implemented, in accordance with various implementations.

FIG. 1 schematically depicts an example environment 100 in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as cloud-based automated assistant component(s) 140, may be implemented using one or more server computing devices that form what is sometimes referred to as a "cloud infrastructure," although this is not required.

In implementations, the environment 100 may include an automated assistant ecosystem that includes, as an example, first assistant device 110A, second assistant device 110B, third assistant device 110C, and fourth assistant device 110D. The assistant devices 110A-D can all be disposed within a household, a business, or other environment. In implementations, the assistant devices 110A-D may be proximately located within the environment 100. In particular, the physical locations of the assistant devices 110A-D in the environment 100 may be such that each of the assistant devices 110A-D is capable of detecting (e.g., via microphone(s)) the same spoken utterance from a user, e.g., when the user's physical location is in the proximity of the assistant devices 110A-D. For example, each of the assistant devices 110A-D may be physically located in the same room (and/or in the same area of a room) in a household, a business, or other environment, and when a user is also located in that same room and makes an utterance, microphone(s) of each of the assistant devices 110A-D may detect that utterance. In another example, each of the assistant devices 110A-D may be physically located in different rooms in a household, a business, or other environment but still situated close enough to each other that, when a user makes an utterance that is detected by microphone(s) of one of the assistant devices 110A-D, microphone(s) of the other assistant devices 110A-D also detect the same utterance.

Further, the assistant devices 110A-D can all be linked together, or otherwise associated with one another, in one or more data structures. For example, the four assistant devices 110A-D can all be registered with the same user account, registered with the same set of user account(s), registered with a particular structure, and/or all assigned to a particular structure in a device topology representation. The device topology representation can include, for each of the assistant devices 110A-D, corresponding unique identifier(s) and can optionally include corresponding unique identifier(s) for other device(s) that are not assistant devices (but can be interacted with via an assistant device), such as IoT device(s) that do not include an assistant interface. Further, the device topology representation can specify device attribute(s) associated with the respective assistant devices 110A-D. The device attributes for a given assistant device can indicate, for example, one or more input and/or output modalities supported by the respective assistant devices, processing capabilities for the respective assistant devices, a make, model, and/or unique identifier (e.g., serial number) of the respective assistant devices (based on which processing capabilities can be determined), and/or other attribute(s). As another example, the assistant devices 110A-D can all be linked together, or otherwise associated with one another, as a function of being connected to the same wireless network, such as a secure access wireless network and/or as a function of collectively being in peer-to-peer communication with one another (e.g., via Bluetooth and after pairing(s)). Put another way, in some implementations, multiple assistant devices can be considered linked together as a function of being in secure network connection with one another and without necessarily being associated with one another in any data structure.

As a non-limiting working example, the first assistant device 110A can be a first type of assistant device, such as a particular model of a smartphone with a display and a camera. The second assistant device 110B can be a second type of assistant device, such as a first model of an interactive standalone speaker with a display and a camera. Assistant device 110C can be a third type of assistant device, such as a second model of an interactive standalone speaker without a display or camera. Assistant device 110D can be a fourth type of assistant device, such as a smartwatch. The third type (assistant device 110C) and fourth type (assistant device 110D) can have less processing capabilities than the second type (assistant device 110B). For example, the third type and the fourth type can have processor(s) with less processing capabilities than processor(s) of the second type. For instance, the processor(s) of the third type can lack any GPU whereas the processor(s) of the second type include GPU(s). Also, for instance, the processor(s) of the third type and the fourth type can have a smaller cache and/or a lower operating frequency than the processors(s) of the second type. As another example, the size of the on-device memory of the third type and the fourth type can be less than the size of the on-device memory of the second type (e.g., 1 GB as compared to 2 GB). As yet another example, the available disk space of the third type and the fourth type can be less than the available disk space of the first type. The available disk space can be different from the currently available disk space. For example, the available disk space can be determined as the currently available disk space plus disk space currently occupied by one or more on-device model(s). As another example, the available disk space can be the total disk space, subtracting away any space occupied by an operating system and/or other particular software. Continuing with the working example, the first type and the second type can have similar processing capabilities. Alternatively, the first type may have greater processing capabilities than the second type (and, by extension, greater processing capabilities than the third type and the fourth type).

In addition to being linked together in data structure(s), two or more (e.g., all) of the assistant devices 110A-D are also at least selectively in communication with one another via local area network(s) (LAN(s)) 108. LAN(s) 108 can include wireless network(s) such as those utilizing Wi-Fi, direct peer-to-peer network(s) such as those utilizing Bluetooth, and/or other communication topologies utilizing other communication protocol(s). Alternatively, one or more of the assistant devices 110A-D may have more limited communication capabilities and may be in direct communication with one or more computing devices that are acting as hub devices, and in indirect communication with the other assistant devices 110A-D. For example, assistant device 110C may utilize Bluetooth and may communicate directly only with assistant device 110B, which may be acting as a hub device. Assistant device 110B may then act as a relay, facilitating communication between assistant device 110C, for which assistant device 110B acts as a hub, and the other assistant devices 110A and 110D.

The assistant device 110A includes an assistant client 120A, which can be a standalone application on top of an operating system or can form all or part of the operating system of the assistant device 110A. The assistant client 120A, in FIG. 1, includes a wake/invocation (hotword) engine 121A1 and one or more associated on-device wake/invocation (hotword) models 131A1. The wake/invocation engine 121A1 can monitor for occurrence of one or more wake or invocation cues (e.g., hotwords) and, responsive to detecting one or more of the cue(s), can invoke one or more previously inactive functions of the assistant client 120A. For example, invoking the assistant client 120A can include causing ASR engine 122A1, NLU engine 123A1, and/or other engine(s) to be activated. For instance, it can cause ASR engine 122A1 to process further audio data frames that follow the wake or invocation cues (whereas prior to invoking no further processing of audio data frames was occurring) and/or can cause the assistant client 120A to transmit the further audio data frames and/or other data to be transmitted to cloud based assistant component(s) 140 for processing (e.g., processing of audio data frames by a remote ASR engine of cloud based assistant component(s) 140).

In some implementations, the wake cue(s) engine 121A can continuously process (e.g., if not in an "inactive" mode) a stream of audio data frames that are based on output from one or more microphones of the assistant device 110A, to monitor for an occurrence of a spoken wake word(s) or invocation phrase(s) (e.g., "OK Assistant", "Hey Assistant"). The processing can be performed by the wake cue(s) engine 121A utilizing one or more of the wake model(s) 131A1. For example, one of the wake model(s) 131A1 can be a neural network model trained to process frames of audio data and generate output that indicates whether one or more wake words are present in the audio data. While monitoring for the occurrence of the wake word(s), the wake cue(s) engine 121 discards (e.g., after temporary storage in a buffer) any audio data frames that do not include the wake word(s). The wake cue(s) engine 121A1 can, in addition to or instead of monitoring for occurrence of wake word(s), monitor for occurrence of other invocation cue(s). For example, the wake cue(s) engine 121A1 can also monitor for a press of an invocation hardware button and/or of an invocation software button. As another example, and continuing with the working example, when the assistant device 110A include a camera, the wake cue(s) engine 121A1 can also optionally process image frame(s) from the camera in monitoring for occurrence of an invocation gesture(s) such as a hand wave while a user's gaze is directed at the camera and/or other invocation cue(s) such as a user's gaze being directed at the camera along with an indication that the user is speaking.

The assistant client 120A, in FIG. 1, also includes an automatic speech recognition (ASR) engine 122A1 and one or more associated on-device ASR models 132A1. The ASR engine 122A1 can be used to process audio data that includes a spoken utterance, to generate a transcription (i.e., sequence of term(s) and/or other token(s)) of the user's utterance. The ASR engine 122A1 can process audio data utilizing the on-device ASR model(s) 132A1. The on-device ASR model(s) 132A1 can include, for example, a two-pass ASR model that is a neural network model and that is utilized by the ASR engine 122A1 to generate a sequence of probabilities over tokens (and the probabilities utilized to generate the transcript). As another example, the on-device ASR model(s) 132A1 can include an acoustic model that is a neural network model, and a language model that includes a mapping of phoneme sequences to words. The ASR engine 122A1 can process audio data using the acoustic model, to generate a sequence of phonemes, and map the sequence of phonemes to particular terms using the language model. Additional or alternative ASR models can be utilized.

The assistant client 120A, in FIG. 1, also includes a natural language understanding (NLU) engine 123A1 and one or more associated on-device NLU models 133A1. The NLU engine 123A1 can generate a symbolic representation, or belief state, that is a semantic representation of natural language text, such as text in a transcription generated by ASR engine 122A1 or typed text (e.g., typed utilizing a virtual keyboard of assistant device 110A). For instance, the belief state could include intent(s) that correspond to the text and optionally parameter(s) (e.g., slot values) for the intent(s). The belief state, once fully formed (e.g., all mandatory parameters resolved) through one or more dialog turns, represents action(s) to be performed responsive to the spoken utterance. In generating the symbolic representation, the NLU engine 123A1 can utilize one or more on-device NLU models 133A1. The NLU model(s) 133A1 can include one or more neural network models that are trained to process text and generate output that indicates intent(s) expressed by the text and/or an indication of which portion(s) of text correspond to which parameter(s) for the intent. The NLU model(s) can additionally or alternatively include one or more models that include mappings of text and/or templates, to corresponding symbolic representation(s). For example, the mappings can include a mapping of the text "what time is it" to an intent of "current time" with parameters of "current location". As another example, the mappings can include a mapping of the template "add

[item(s)] to my shopping list" to an intent of "insert in shopping list" with parameter(s) of the item(s) that are included in the actual natural language that corresponds to the [item(s)] in the template.

The assistant client 120A, in FIG. 1, also includes a fulfillment engine 124A1 and one or more associated on-device fulfillment models 134A1. The fulfillment engine 124A1 can utilize a fully formed symbolic representation, from the NLU engine 123A1, to perform, or cause performance of, the action(s) that corresponds to the symbolic representation. The action(s) can include providing responsive user interface output (e.g., audible and/or visual user interface output), controlling smart device(s), and/or performing other action(s). In performing or causing performance of the action(s), the fulfillment engine 124A1 can utilize fulfillment model(s) 134A1. As one example, for an intent of "turn on" with parameter(s) that specify particular smart light(s), the fulfillment engine 124A1 can utilize the fulfillment model(s) 134A1 to identify network address(es) of the particular smart light(s) and/or command(s) to transmit to cause the particular smart light(s) to transition to an "on" state. As another example, for an intent of "current" with a parameter of "current location", the fulfillment engine 124A1 can utilize the fulfillment model(s) 134A1 to identify that a current time at the assistant device 110A should be retrieved and audibly rendered (utilizing the TTS engine 125A1).

The assistant client 120A, in FIG. 1, also includes a text-to-speech (TTS) engine 125A1 and one or more associated on-device TTS models 135A1. The TTS engine 125A1 can process text (or a phonetic representation thereof) utilizing the on-device TTS model(s) 135A1 to generate synthesized speech. The synthesized speech can be audibly rendered via speaker(s) of the assistant device 110A local text-to-speech ("TTS") engine (that converts text to speech). Synthesized speech can be generated and rendered as all or part of a response from the automated assistant and/or in prompting the user to define and/or clarify parameter(s) and/or intent(s) (e.g., as orchestrated by NLU engine 123A1 and/or a separate dialog state engine).

The assistant client 120A, in FIG. 1, also includes an authentication engine 126A1 and one or more associated on-device authentication models 136A1. The authentication engine 126A1 can utilize one or more authentication technique(s) to verify which of multiple registered user is interacting with the assistant device 110 or, if only a single user is registered for the assistant device 110, whether it is the registered user interacting with the assistant device 110 (or instead a guest/unregistered user). As one example, text-dependent speaker verification(s) (TD-SV(s)) can be generated and stored for each of the registered users (e.g., in association with their corresponding user profiles), with permission from the associated user(s). The authentication engine 126A1 can utilize a TD-SV model, of the on-device authentication model(s) 136A1 in generating a corresponding TD-SV and/or in processing a corresponding portion of audio data TD-SV to generate a corresponding current TD-SV that can then be compared to the stored TD-SV(s) to determine whether there is a match. As other examples, the authentication engine 126A1 can additionally or alternatively utilize text-independent speaker verification (TI-SV) techniques, speaker verification techniques, facial verification techniques, and/or other verification technique(s) (e.g., PIN entry)—and corresponding on-device authentication model(s) 136A1 in authenticating a particular user.

The assistant client 120A, in FIG. 1, also includes a warm word(s) engine 127A1 and one or more associated on-device warm word(s) models 137A1. The warm word(s) engine 127A1 can at least selectively monitor for occurrence of one or more warm word(s) or other warm cue(s) and, responsive to detecting one or more of the warm word(s) or other warm cue(s), cause a particular action to be performed by the assistant client 120A. The warm word(s) can be in addition to any wake word(s) or other wake cue(s) and each of the warm word(s) can be at least selectively active (e.g., enabled). Notably, detecting the occurrence of a warm cue causes a particular action to be performed even when the detected occurrence is not preceded by any wake cue. Accordingly, when a warm cue is a particular word or words, a user can simply speak the word(s), without needing to provide any wake cue(s), and cause performance of a corresponding particular action.

The assistant client 120A also includes a voice activity detector (VAD) engine 128A1 and one or more associated on-device VAD models 138A1. The VAD engine 128A1 can at least selectively monitor for occurrence of voice activity in audio data and, responsive to detecting an occurrence, cause one or more functions to be performed by the assistant client 120A. For example, the VAD engine 128A1, responsive to detecting voice activity, can cause the wake cue(s) engine 121A1 to be activated. As another example, the VAD engine 128A1 can be utilized in a continued listening mode to monitor for occurrence of voice activity in audio data and, responsive to detecting an occurrence, cause the ASR engine 122A1 to be activated. The VAD engine 128A1 can process audio data utilizing VAD model(s) 138A1 in determining whether voice activity is present in the audio data.

The assistant client 120A also includes arbitration engine 129A1. The arbitration engine 129A1 may perform arbitration between assistant devices 110A-D, based on interaction cues, to determine a target assistant device to respond to a query that is included in a spoken utterance of a user. The arbitration engine 129A1 may perform a synchronization determination in which a subset of the assistant devices 110A-D (e.g., assistant devices 110A, 110C, and 110D) is identified based on determining that each assistant device in the subset has detected, within a time window, one or more hotwords being present in a spoken utterance of the user. The arbitration engine 129A1 may determine a similarity score for each assistant device in the subset, the similarity score for a particular assistant device being based on a query signal for the particular assistant device and an interaction signal for the particular assistant device. The arbitration engine 129A1 may select a target assistant device from the subset, based on the similarity scores for each of the assistant devices in the subset. The arbitration engine 129A1 may cause the target assistant device to respond to a query that is included in the spoken utterance and/or may cause the other assistant devices in the subset, except for the target computing device, to suppress activation of one or more automated assistant functions of the assistant device, e.g., by sending one or more commands to one or more of the assistant devices 110A-D.

Particular engines and corresponding models have been described with respect to assistant client 120A. However, it is noted that some engines can be omitted and/or additional engine(s) can be included. It is also noted that assistant client 120A, through its various on-device engines and corresponding models, can fully process many assistant requests, including many assistant requests that are provided as spoken utterances. However, because the assistant device 110A is relatively constrained in terms of processing capabilities, there are still many assistant requests that cannot be fully processed locally at the assistant device 110A. For example, the NLU engine 123A1 and/or corresponding NLU models 133A1 may only cover a subset of all available intents and/or parameters available via the automated assistant. As another example, the fulfillment engine 124A1 and/or corresponding fulfillment model(s) may only cover a subset of available fulfillments. As yet another example, the ASR engine 122A1 and corresponding ASR model(s) 132A1 may not be robust and/or accurate enough to correctly transcribe various spoken utterances.

In view of these and other considerations, cloud based assistant component(s) 140 can still be at least selectively utilized in performing at least some processing of assistant requests received at the assistant device 110A. Cloud based automated assistant components 140 can include counterpart engines and/or models to those of the assistant device 110A (and/or additional or alternatives). However, since cloud based automated assistant components 140 can leverage the virtually limitless resources of the cloud, one or more the cloud based counterparts can be more robust and/or accurate than those of the assistant client 120A. As one example, in response to a spoken utterance that seeks performance of assistant action(s) not supported by the local NLU engine 123A1 and/or the local fulfillment engine 124A1, the assistant client 120A can transmit audio data for the spoken utterance, and/or a transcription thereof generated by ASR engine 122A1, to the cloud based automated assistant components 140. The cloud based automated assistant components 140 (e.g., an NLU engine and/or fulfillment engine thereof) can perform more robust processing of such data, enabling resolution and/or performance of the assistant action(s). The transmitting of data to the cloud based automated assistant components 140 is via one or more wide area networks (WAN(s)) 109, such as the Internet or a private WAN. Additionally, in some implementations, cloud based assistant component(s) 140 may optionally perform the functions of the arbitration engine 129A1, described above.

The second assistant device 110B includes an assistant client 120B, which can be a standalone application on top of an operating system or can form all or part of the operating system of the assistant device 110B. Like assistant client 120A, the assistant client 120B includes: a wake/invocation engine 121B1 and one or more associated on-device wake/invocation models 131B1; an ASR engine 122B1 and one or more associated on-device ASR models 132B1; an NLU engine 123B1 and one or more associated on-device NLU models 133B1; a fulfillment engine 124B1 and one or more associated on-device fulfillment models 134B1; a TTS engine 125B1 and one or more associated on-device TTS models 135B1; an authentication engine 126B1 and one or more associated on-device authentication models 136B1; a warm word(s) engine 127B1 and one or more associated on-device warm word(s) models 137B1; and a VAD engine 128B1 and one or more associated on-device VAD models 138B1.

Some or all of the engines and/or the models of assistant client 120B can be the same as those of assistant client 120A and/or some or all of the engines and/or the models can differ. For example, the wake cue(s) engine 121B1 may lack the functionality to detect wake cue(s) in image(s) and/or the wake model(s) 131B1 may lack model(s) for processing image(s) for detection of wake cue(s)—while wake cue(s) engine 121A1 includes such functionality and wake model(s) 131A1 include such model(s). This can be due to, for example, assistant device 110A including a camera and assistant device 110B not including a camera. As another example, the ASR model(s) 132B1 utilized by ASR engine 122B1 can differ from the ASR model(s) 132A1 utilized by ASR engine 122A1. This can be due to, for example, different models being optimized for differing processor and/or memory capabilities amongst the assistant device 110A and the assistant device 110B.

Particular engines and corresponding models have been described with respect to assistant client 120B. However, it is noted that some engines can be omitted and/or additional engine(s) can be included. It is also noted that assistant client 120B, through its various on-device engines and corresponding models, can fully process many assistant requests, including many assistant requests that are provided as spoken utterances. However, because the client device 110B is relatively constrained in terms of processing capabilities, there are still many assistant requests that cannot be fully processed locally at the assistant device 110B. In view of these and other considerations, cloud based assistant component(s) 140 can still be at least selectively utilized in performing at least some processing of assistant requests received at the assistant device 110B.

The third assistant device 110C includes an assistant client 120C, which can be a standalone application on top of an operating system or can form all or part of the operating system of the assistant device 110C. Like assistant client 120A and assistant client 120B, the assistant client 120C includes: a wake/invocation engine 121C1 and one or more associated on-device wake/invocation models 131C1; an authentication engine 126C1 and one or more associated on-device authentication models 136C1; a warm word(s) engine 127C1 and one or more associated on-device warm word(s) models 137C1; and a VAD engine 128C1 and one or more associated on-device VAD models 138C1. Some or all of the engines and/or the models of assistant client 120C can be the same as those of assistant client 120A and/or assistant client 120B and/or some or all of the engines and/or the models can differ.

However, it is noted that unlike assistant client 120A and assistant client 120B, the assistant client 120C does not include: any ASR engine or associated models; any NLU engine or associated models; any fulfillment engine or associated models; and any TTS engine or associated models. Further, it is also noted that assistant client 120C, through its various on-device engines and corresponding models, can fully process only certain assistant request(s) (i.e., those that conform to warm word(s) detected by warm word(s) engine 127C1) and cannot process many assistant requests, such as those that are provided as spoken utterances and that do not conform to a warm cue. In view of these and other considerations, cloud based assistant component(s) 140 can still be at least selectively utilized in performing at least some processing of assistant requests received at the assistant device 110C.

The fourth assistant device 110D includes an assistant client 120D, which can be a standalone application on top of an operating system or can form all or part of the operating system of the assistant device 110D. Like assistant client 120A, assistant client 120B, and assistant client 120C, the assistant client 120D includes: a wake/invocation engine 121D1 and one or more associated on-device wake/invocation models 131D1; an authentication engine 126D1 and one or more associated on-device authentication models 136D1; a warm word(s) engine 127D1 and one or more associated on-device warm word(s) models 137D1; and a VAD engine 128D1 and one or more associated on-device VAD models 138D1. Some or all of the engines and/or the models of assistant client 120D can be the same as those of assistant client 120A, assistant client 120B, and/or assistant client 120C—and/or some or all of the engines and/or the models can differ.

However, it is noted that unlike assistant client 120A and assistant client 120B—and like assistant client 120C, the assistant client 120D does not include: any ASR engine or associated models; any NLU engine or associated models; any fulfillment engine or associated models; and any TTS engine or associated models. Further, it is also noted that assistant client 120D, through its various on-device engines and corresponding models, can fully process only certain assistant request(s) (i.e., those that conform to warm cue(s) detected by warm word(s) engine 127D1) and cannot process many assistant requests, such as those that are provided as spoken utterances and that do not conform to a warm word. In view of these and other considerations, cloud based assistant component(s) 140 can still be at least selectively utilized in performing at least some processing of assistant requests received at the assistant device 110D.

FIG. 2 is a flowchart illustrating an example method 200 for arbitration between automated assistant devices based on interaction cues, in accordance with implementations disclosed herein. For convenience, the operations of the flowchart are described with reference to a system that performs the operations. This system may include various components of various computer systems, such as one or more components of the assistant devices 110A-D. Moreover, while operations of method 200 are shown in a particular order, this is not meant to be limiting. One or more operations may be reordered, omitted, or added.

At block 210, the system receives, via one or more microphones of a first computing device, first audio data that captures a spoken utterance of a user. In implementations, at block 210, the assistant client 120A executing on a first computing device (e.g., assistant device 110A) receives, via one or more microphones of the first computing device, first audio data that captures a spoken utterance of a user.

At block 220, the system determines that each of one or more additional computing devices has detected, via one or more microphones of the one or more additional computing devices, the spoken utterance of the user. In implementations, at block 220, the arbitration engine 129A1 of the assistant client 120A executing on the first computing device (e.g., assistant device 110A) determines that each of one or more additional computing devices (e.g., assistant device 110B and assistant device 110D) has detected, via one or more microphones of the one or more additional computing devices, the spoken utterance of the user.

In some implementations, the first computing device and the one or more additional computing devices are included in a group of computing devices. In some implementations, each computing device in the group of computing devices is associated with a same user account. In some implementations, the group of computing devices includes a smartphone, a smartwatch, and a smart speaker. In some implementations, the group of computing devices further includes a second computing device (e.g., assistant device 110C) that is different from the first computing device (e.g., assistant device 110A) and the one or more additional computing devices (e.g., assistant device 110B and assistant device 110D).

Still referring to block 220, in an example, the arbitration engine 129A1 may determine that two additional computing devices (e.g., assistant device 110B and assistant device 110D), that are included in a group of computing devices (e.g., assistant devices 110A-D), have detected the spoken utterance of the user. In some implementations, each of the assistant devices 110A-D may be associated with a same user account.

Still referring to block 220, in some implementations, determining that each of the one or more additional computing devices has detected the spoken utterance of the user includes determining (e.g., by the arbitration engine 129A1) that each of the first computing device (e.g., assistant device 110A) and the one or more additional computing devices (e.g., assistant device 110B and assistant device 110D) has detected, within a time window, one or more hotwords being present in the spoken utterance of the user. The time window may be a window that allows for small differences in a time when the one or more hotwords are detected between different computing devices, based on differing physical distances between the user who uttered the one or more hotwords and each of the different computing devices.

In other implementations, determining that each of the one or more additional computing devices has detected the spoken utterance of the user includes determining (e.g., by the arbitration engine 129A1) that each of the first computing device (e.g., assistant device 110A) and the one or more additional computing devices (e.g., assistant device 110B and assistant device 110D) has detected, at substantially the same time, one or more hotwords being present in the spoken utterance of the user.

In some implementations, the system may process (e.g., using wake/invocation engine 121A1) the first audio data using a machine learning model to generate a predicted output that indicates a probability of the one or more hotwords being present in the spoken utterance of the user, that is captured in the first audio data. In some implementations, determining that the first computing device has detected the one or more hotwords is based on the probability of the one or more hotwords being present in the spoken utterance of the user satisfying a threshold that is indicative of the one or more hotwords being present in the spoken utterance of the user.

In some implementations, determining that each of the one or more additional computing devices has detected the one or more hotwords is based on each of the one of the one or more additional computing devices determining that a probability of one or more hotwords being present in the spoken utterance of the user satisfies a threshold that is indicative of the one or more hotwords being present in the spoken utterance of the user.

Still referring to FIG. 2, at block 230, the system determines that hotword arbitration is to be initiated between the first computing device and the one or more additional computing devices. In implementations, at block 230, the arbitration engine 129A1 of the assistant client 120A executing on the first computing device (e.g., assistant device 110A) may determine that hotword arbitration is to be initiated between the first computing device (e.g., assistant device 110A) and the one or more additional computing devices (e.g., assistant device 110B and assistant device 110D). In some implementations, determining that hotword arbitration is to be initiated is based on the first computing device (e.g., assistant device 110A) receiving, at block 210, the first audio data that captures the spoken utterance of the user and based on determining (e.g., by the arbitration engine 129A1), at block 220, that each of the one or more additional computing devices (e.g., assistant device 110B and assistant device 110D) has detected the spoken utterance of the user. Responsive to determining that hotword arbitration is to be initiated at block 230, the system may proceed to blocks 240 through 270.

In some implementations, the second computing device (e.g., assistant device 110C) may be excluded from hotword arbitration based on determining that the second computing device has not detected the spoken utterance of the user.

Still referring to FIG. 2, at block 240, for each of the first computing device and the one or more additional computing devices, the system identifies a similarity score for the computing device, the similarity score being based on (i) a query signal for the computing device and (ii) an interaction signal for the computing device. In implementations, at block 240, for each of the first computing device (e.g., assistant device 110A) and the one or more additional computing devices (e.g., assistant device 110B and assistant device 110D), the arbitration engine 129A1 of the assistant client 120A executing on the first computing device (e.g., assistant device 110A) may identify a similarity score for the computing device, the similarity score being based on (i) a query signal for the computing device and (ii) an interaction signal for the computing device.

In some implementations, the query signal for the computing device may be a time series, each data point in the time series indicating a probability of one or more hotwords being present at a particular time. In some implementations, the interaction signal for the computing device is a time series, each data point in the time series indicating a level of user interaction with the computing device at a particular time.

In some implementations, the interaction signal may be determined differently for different types of devices, based on typical types of user interaction for each type of device. For example, a typical type of user interaction with a smartphone may include touching a screen and activating one or more buttons on the smartphone. A typical type of user interaction with an earbud may include tapping the stem of an earbud. A typical type of user interaction with a smart speaker may include interacting with a capacitive touchpad for volume control, etc. Other user devices may have other associated types of user interaction.

In some implementations, the interaction signal for a particular device may be based on a frequency of interaction (e.g., a number of touch events per second) with the particular device. In some implementations, the interaction signal may be based on content that is being interacted with (e.g., interactions with a map and/or with email may be interpreted as representing a relatively higher level of engagement, and interactions with a clock may be interpreted as a representing a relatively lower level of engagement). In some implementations, the interaction signal for a particular device may be based on both a frequency of interaction with the particular device and the content that is being interacted with.

Still referring to block 240, in some implementations, identifying the similarity score for the computing device may include determining a measure (e.g., by the arbitration engine 129A1) based on comparing the query signal for the computing device and the interaction signal for the computing device. In some implementations, determining the measure based on comparing the query signal for the computing device and the interaction signal for the computing device may include determining a dot product of the query signal for the computing device and the interaction signal for the computing device. In other implementations, determining the measure based on comparing the query signal for the computing device and the interaction signal for the computing device may include determining a cosine similarity of the query signal for the computing device and the interaction signal for the computing device.

Still referring to FIG. 2, at block 250, the system selects a target computing device, from the first computing device and the one or more additional computing devices, based on the similarity scores for each of the first computing device and the one or more additional computing devices. In implementations, at block 250, the arbitration engine 129A1 of the assistant client 120A executing on the first computing device (e.g., assistant device 110A) may select a target computing device (e.g., assistant device 110D), from the first computing device (e.g., assistant device 110A) and the one or more additional computing devices (e.g., assistant device 110B and assistant device 110D), based on the similarity scores, determined at block 240, for each of the first computing device and the one or more additional computing devices. For example, the arbitration engine 129A1 of the assistant client 120A may select assistant device 110D as the target computing device based on assistant device 110D having a similarity score that is higher than the similarity score for assistant device 110A and the similarity score for assistant device 110B.

At block 260, the system causes the target computing device to respond to a query that is included in the spoken utterance of the user or to respond to a query that is included in a subsequent spoken utterance, of the user, that follows the spoken utterance of the user. In implementations, at block 260, in response to selecting the target computing device at block 250, the arbitration engine 129A1 of the assistant client 120A executing on the first computing device (e.g., assistant device 110A) may cause the target computing device (e.g., assistant device 110D), selected at block 250, to respond to a query that is included in the spoken utterance of the user or to respond to a query that is included in a subsequent spoken utterance, of the user, that follows the spoken utterance of the user. For example, the arbitration engine 129A1 may send one or more commands to assistant device 110D to cause assistant device 110D to respond to the query. Alternatively, the arbitration engine 129A1 may cause assistant device 110D to respond to the query by avoiding sending, to assistant device 110D, one or more commands to suppress activation of one or more automated assistant functions.

At block 270, for each of the first computing device and the one or more additional computing devices except for the target computing device, the system suppresses activation of one or more automated assistant functions of the computing device. In implementations, at block 270, in response to selecting the target computing device at block 250, for each of the first computing device and the one or more additional computing devices except for the target computing device (e.g., for assistant device 110A and assistant device 110B and excluding assistant device 110D which is the target computing device selected at block 250), the arbitration engine 129A1 of the assistant client 120A executing on the first computing device (e.g., assistant device 110A) may suppress activation of one or more automated assistant functions of the computing device (e.g., by sending one or more commands to assistant device 110A and assistant device 110B).

FIG. 3 is a flowchart illustrating an example method 300 for arbitration between automated assistant devices based on interaction cues, in accordance with implementations disclosed herein. For convenience, the operations of the flowchart are described with reference to a system that performs the operations. This system may include various components of various computer systems, such as one or more components of the assistant devices 110A-D. Moreover, while operations of method 300 are shown in a particular order, this is not meant to be limiting. One or more operations may be reordered, omitted, or added.

At block 310, the system determines, at a server, that each of a plurality of computing devices, that form a subset of a group of computing devices associated with a user account, has detected one or more hotwords within a time window. In implementations, at block 310, the cloud based assistant component(s) 140 determine that each of a plurality of computing devices (e.g., assistant device 110A, assistant device 110B, and assistant device 110D), that form a subset of a group of computing devices (e.g., assistant devices 110A-D) associated with a user account, has detected one or more hotwords within a time window.

At block 320, the system initiates hotword arbitration between each of the plurality of computing devices, based on determining that each of the plurality of computing devices has detected the one or more hotwords within the time window. In implementations, at block 320, the cloud based assistant component(s) 140 initiates hotword arbitration between each of the plurality of computing devices (e.g., assistant device 110A, assistant device 110B, and assistant device 110D), based on determining at block 310 that each of the plurality of computing devices has detected the one or more hotwords within the time window. Responsive to initiating hotword arbitration, the system may proceed to blocks 330 through 360.

At block 330, for each of the plurality of computing devices, the system identifies a similarity score for the computing device, the similarity score being based on (i) a query signal for the computing device and (ii) an interaction signal for the computing device. In implementations, at block 330, for each of the plurality of computing devices (e.g., assistant device 110A, assistant device 110B, and assistant device 110D), the cloud based assistant component(s) 140 may identify a similarity score for the computing device, the similarity score being based on (i) a query signal for the computing device and (ii) an interaction signal for the computing device.

In some implementations, the query signal for the computing device may be a time series, each data point in the time series indicating a probability of one or more hotwords being present at a particular time. In some implementations, the interaction signal for the computing device is a time series, each data point in the time series indicating a level of user interaction with the computing device at a particular time.

In some implementations, the interaction signal may be determined differently for different types of devices, based on typical types of user interaction for each type of device. For example, a typical type of user interaction with a smartphone may include touching a screen and activating one or more buttons on the smartphone. A typical type of user interaction with an earbud may include tapping the stem of an earbud. A typical type of user interaction with a smart speaker may include interacting with a capacitive touchpad for volume control, etc. Other user devices may have other associated types of user interaction.

In some implementations, the interaction signal for a particular device may be based on a frequency of interaction (e.g., a number of touch events per second) with the particular device. In some implementations, the interaction signal may be based on content that is being interacted with (e.g., interactions with a map and/or with email may be interpreted as representing a relatively higher level of engagement, and interactions with a clock may be interpreted as a representing a relatively lower level of engagement). In some implementations, the interaction signal for a particular device may be based on both a frequency of interaction with the particular device and the content that is being interacted with.

Still referring to block 330, in some implementations, identifying the similarity score for the computing device may include determining a measure (e.g., by the cloud based assistant component(s) 140) based on comparing the query signal for the computing device and the interaction signal for the computing device. In some implementations, determining the measure based on comparing the query signal for the computing device and the interaction signal for the computing device may include determining a dot product of the query signal for the computing device and the interaction signal for the computing device. In other implementations, determining the measure based on comparing the query signal for the computing device and the interaction signal for the computing device may include determining a cosine similarity of the query signal for the computing device and the interaction signal for the computing device.

Still referring to block 330, in some implementations, identifying the similarity score for the computing device may include determining a dot product of the query signal for the computing device and the interaction signal for the computing device. In other implementations, identifying the similarity score for the computing device may include determining a cosine similarity of the query signal for the computing device and the interaction signal for the computing device.

Still referring to FIG. 3, at block 340, the system selects a target computing device, from the plurality of computing devices, based on the similarity scores for each of the plurality of computing devices. In implementations, at block 340, the cloud based assistant component(s) 140 may select a target computing device (e.g., assistant device 110D), from the plurality of computing devices (e.g., assistant device 110A, assistant device 110B, and assistant device 110D), based on the similarity scores, determined at block 330, for each of the plurality of computing devices. For example, the cloud based assistant component(s) 140 may select assistant device 110D as the target computing device based on assistant device 110D having a similarity score that is higher than the similarity score for assistant device 110A and the similarity score for assistant device 110B.

At block 350, the system sends, from the server to the target computing device, an instruction causing the target computing device to respond to a query from the user. In implementations, at block 350, in response to selecting the target computing device at block 340, the cloud based assistant component(s) 140 may send, from the cloud based assistant component(s) 140 to the target computing device (e.g., assistant device 110D), selected at block 340, an instruction causing the target computing device to respond to a query from the user. For example, the cloud based assistant component(s) 140 may send one or more commands to assistant device 110D to cause assistant device 110D to respond to the query. Alternatively, the cloud based assistant component(s) 140 may cause assistant device 110D to respond to the query by avoiding sending, to assistant device 110D, one or more commands to suppress activation of one or more automated assistant functions.

At block 360, the system sends, from the server to each of the plurality of computing devices except for the target computing device, an instruction suppressing activation of one or more automated assistant functions. In implementations, at block 360, in response to selecting the target computing device at block 340, the cloud based assistant component(s) 140 may send, from the cloud based assistant component(s) 140 to each of the plurality of computing devices except for the target computing device (e.g., send to assistant device 110A and assistant device 110B and excluding assistant device 110D which is the target computing device selected at block 340), an instruction suppressing activation of one or more automated assistant functions. For example, the cloud based assistant component(s) 140 may send one or more commands to assistant device 110A and to assistant device 110B to cause assistant device 110A and assistant device 110B to avoid responding to the query.

Figure 4:
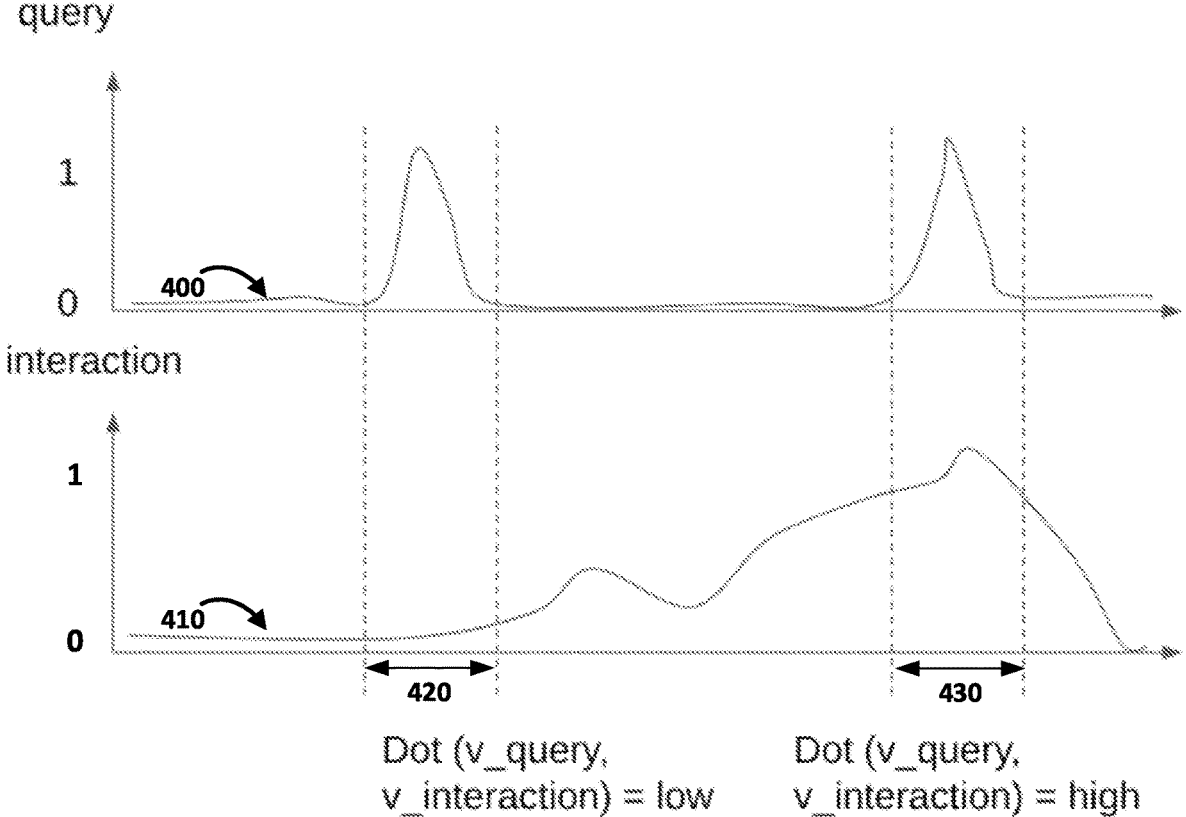
FIG. 4 depicts an example applications of techniques described herein, in accordance with various implementations.

FIG. 4 depicts an example of a query signal 400 and an interaction signal 410 corresponding to a particular assistant device, that may be one of the assistant devices 110A-D of FIG. 1. In some implementations, as described with respect to block 240 of FIG. 2, the arbitration engine 129A1 may determine a similarity score for the particular assistant device, the similarity score for the particular assistant device being based on the query signal 400 for the particular assistant device and the interaction signal 410 for the particular assistant device, e.g., during a time window such as time window 420 or time window 430, either of which may be the same time window as the time window of block 220 or another time window. In other implementations, as described with respect to block 330 of FIG. 3, the cloud based assistant component(s) 140 may determine a similarity score for the particular assistant device, the similarity score for the particular assistant device being based on the query signal 400 for the particular assistant device and the interaction signal 410 for the particular assistant device, e.g., during a time window such as time window 420 or time window 430, either of which may be the same time window as the time window of block 220 or another time window.

In the example of FIG. 4, a similarity score for the particular assistant device for the time window 420 (which may include a period of time before and after a first utterance of a hotword and/or a first query) may be determined based on a dot product of the query signal 400 (v_query) for the particular assistant device during the time window 420 and the interaction signal 410 (v_interaction) for the particular assistant device during the time window 420. In this example, the dot product may be comparatively low and thus the similarity score for the particular assistant device for the time window 420 may be comparatively low (e.g., based on a low level of user interaction with the particular assistant device during the time window 420). A query signal and an interaction signal (not depicted) corresponding to another assistant device may have a greater degree of correlation during the time window 420 (e.g., based on a high level of user interaction during the time window 420), and therefore the dot product of the query signal and the interaction signal may be comparatively larger and thus the similarity score during the time window 420 may be comparatively higher.

Likewise, a similarity score for the particular assistant device for the time window 430 (which may include a period of time before and after a second utterance of a hotword and/or a second query, and which may be later in time than the time window 420) may be determined based on a dot product of the query signal 400 (v_query) for the particular assistant device during the time window 430 and the interaction signal 410 (v_interaction) for the particular assistant device during the time window 430. In this example, the dot product may be comparatively high and thus the similarity score for the particular assistant device for the time window 430 may be comparatively high (e.g., based on a high level of user interaction with the particular assistant device during the time window 430). A query signal and an interaction signal (not depicted) corresponding to another assistant device may have a lesser degree of correlation during the time window 430 (e.g., based on a low level of user interaction during the time window 430), and therefore the dot product of the query signal and the interaction signal may be comparatively smaller and thus the similarity score during the time window 430 may be comparatively lower.

Figure 5:
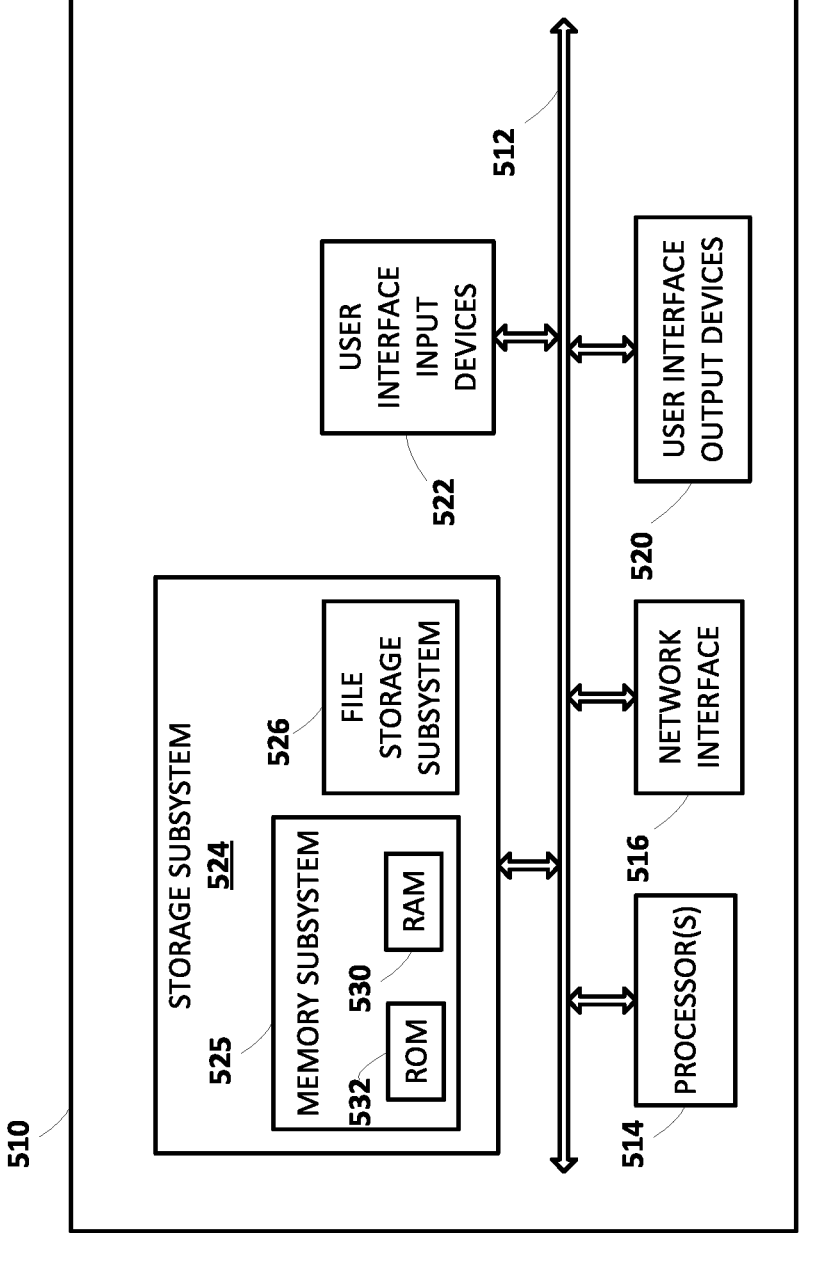
FIG. 5 depicts an example architecture of a computing device.

FIG. 5 is a block diagram of an example computing device 510 that may optionally be utilized to perform one or more aspects of techniques described herein. In some implementations, one or more of a client device, cloud-based automated assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIG. 1.

These software modules are generally executed by processor 514 alone or in combination with other processors. The memory subsystem 525 included in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:

receiving, via one or more microphones of a first computing device, first audio data that captures a spoken utterance of a user;

determining that each of one or more additional computing devices has detected, via one or more microphones of the one or more additional computing devices, the spoken utterance of the user, wherein the first computing device and the one or more additional computing devices are included in a group of computing devices;

determining that hotword arbitration is to be initiated between the first computing device and the one or more additional computing devices, wherein determining that hotword arbitration is to be initiated is based on the first computing device receiving the first audio data that captures the spoken utterance of the user and based on determining that each of the one or more additional computing devices has detected the spoken utterance of the user; and responsive to determining that hotword arbitration is to be initiated:

for each of the first computing device and the one or more additional computing devices, identifying a similarity score for the computing device, the similarity score being based on (i) a query signal for the computing device, the query signal comprising a first time series indicating a probability of one or more hotwords being present over a time window, the first time series including a first plurality of data points, and (ii) an interaction signal for the computing device, the interaction signal comprising a second time series indicating a level of user interaction with the computing device over the time window, the second time series including a second plurality of data points;

selecting a target computing device, from the first computing device and the one or more additional computing devices, based on the similarity scores for each of the first computing device and the one or more additional computing devices; and causing the target computing device to respond to a query that is included in the spoken utterance of the user or to respond to a query that is included in a subsequent spoken utterance, of the user, that follows the spoken utterance of the user.

2. The method according to claim 1, wherein determining that each of the one or more additional computing devices has detected the spoken utterance of the user comprises determining that each of the first computing device and the one or more additional computing devices has detected, within the time window, one or more hotwords being present in the spoken utterance of the user.

3. The method according to claim 2, further comprising processing the first audio data using a machine learning model to generate a predicted output that indicates a probability of the one or more hotwords being present in the spoken utterance of the user, that is captured in the first audio data, wherein determining that the first computing device has detected the one or more hotwords is based on the probability of the one or more hotwords being present in the spoken utterance of the user satisfying a threshold that is indicative of the one or more hotwords being present in the spoken utterance of the user.

4. The method according to claim 3, wherein determining that each of the one or more additional computing devices has detected the one or more hotwords is based on each of the one or more additional computing devices determining that the probability of one or more hotwords being present in the spoken utterance of the user satisfies the threshold that is indicative of the one or more hotwords being present in the spoken utterance of the user.

5. The method according to claim 1, wherein identifying the similarity score for the computing device comprises determining a measure based on comparing the query signal for the computing device and the interaction signal for the computing device.

6. The method according to claim 5, wherein determining the measure based on comparing the query signal for the computing device and the interaction signal for the computing device comprises determining a dot product of the query signal for the computing device and the interaction signal for the computing device.

7. The method according to claim 5, wherein determining the measure based on comparing the query signal for the computing device and the interaction signal for the computing device comprises determining a cosine similarity of the query signal for the computing device and the interaction signal for the computing device.

8. The method according to claim 1, further comprising, in response to selecting the target computing device, for each of the first computing device and the one or more additional computing devices except for the target computing device, suppressing activation of one or more automated assistant functions of the computing device.

9. The method according to claim 1, wherein each computing device in the group of computing devices is associated with a same user account.

10. The method according to claim 1, wherein:

the group of computing devices further includes a second computing device that is different from the first computing device and the one or more additional computing devices, and the second computing device is excluded from hotword arbitration based on determining that the second computing device has not detected the spoken utterance of the user.

11. The method according to claim 1, wherein the group of computing devices includes a smartphone, a smartwatch, and a smart speaker.

12. A computer program product comprising one or more non-transitory computer-readable storage media having program instructions collectively stored on the one or more computer-readable storage media, the program instructions executable to:

determine, at a server, that each of a plurality of computing devices, that form a subset of a group of computing devices associated with a user account, has detected one or more hotwords within a time window; and initiate hotword arbitration between each of the plurality of computing devices, based on determining that each of the plurality of computing devices has detected the one or more hotwords within the time window, comprising:

for each of the plurality of computing devices, identifying a similarity score for the computing device, the similarity score being based on (i) a query signal for the computing device, the query signal comprising a first time series indicating a probability of one or more hotwords being present over the time window, the first time series including a first plurality of data points, and (ii) an interaction signal for the computing device, the interaction signal comprising a second time series indicating a level of user interaction with the computing device over the time window, the second time series including a second plurality of data points;

selecting a target computing device, from the plurality of computing devices, based on the similarity scores for each of the plurality of computing devices; and sending, from the server to the target computing device, an instruction causing the target computing device to respond to a query from the user.

13. The computer program product according to claim 12, wherein identifying the similarity score for the computing device comprises determining a dot product of the query signal for the computing device and the interaction signal for the computing device.

14. The computer program product according to claim 12, wherein identifying the similarity score for the computing device comprises determining a cosine similarity of the query signal for the computing device and the interaction signal for the computing device.

15. The computer program product according to claim 12, the program instructions further being executable to send, from the server to each of the plurality of computing devices except for the target computing device, an instruction suppressing activation of one or more automated assistant functions.

16. A system comprising:

a processor, a computer-readable memory, one or more computer-readable storage media, and program instructions collectively stored on the one or more computer-readable storage media, the program instructions executable to:

receive, via one or more microphones of a first computing device, first audio data that captures a spoken utterance of a user;

determine that each of one or more additional computing devices has detected, via one or more microphones of the one or more additional computing devices, the spoken utterance of the user, wherein the first computing device and the one or more additional computing devices are included in a group of computing devices;

determine that hotword arbitration is to be initiated between the first computing device and the one or more additional computing devices, wherein determining that hotword arbitration is to be initiated is based on the first computing device receiving the first audio data that captures the spoken utterance of the user and based on determining that each of the one or more additional computing devices has detected the spoken utterance of the user; and responsive to determining that hotword arbitration is to be initiated:

for each of the first computing device and the one or more additional computing devices, identify a similarity score for the computing device, the similarity score being based on (i) a query signal for the computing device, the query signal comprising a first time series indicating a probability of one or more hotwords being present over a time window, the first time series including a first plurality of data points, and (ii) an interaction signal for the computing device, the interaction signal comprising a second time series indicating a level of user interaction with the computing device over the time window, the second time series including a second plurality of data points;

select a target computing device, from the first computing device and the one or more additional computing devices, based on the similarity scores for each of the first computing device and the one or more additional computing devices; and cause the target computing device to respond to a query that is included in the spoken utterance of the user or to respond to a query that is included in a subsequent spoken utterance, of the user, that follows the spoken utterance of the user.

\* \* \* \* \*